(12) United States Patent
Park et al.

(10) Patent No.: US 7,794,171 B2
(45) Date of Patent: Sep. 14, 2010

(54) TELESCOPIC SERVOMANIPULATOR COUPLING/DECOUPLING APPARATUS

(75) Inventors: Byung Suk Park, Daejeon (KR); Jong Kwang Lee, Daejeon (KR); Hyo Jik Lee, Daejeon (KR); Dong Hee Hong, Daejeon (KR); Ji Sup Yoon, Daejeon (KR)

(73) Assignees: Korea Atomic Energy Research Institute, Daejeon (KR); Korea Hydo & Nuclear Power Co., Ltd., Seoul (KR)

( * ) Notice: Subject to any disclaimer, the term of this patent is extended or adjusted under 35 U.S.C. 154(b) by 557 days.

(21) Appl. No.: 11/819,654

(22) Filed: Jun. 28, 2007

(65) Prior Publication Data
US 2008/0042432 A1    Feb. 21, 2008

(30) Foreign Application Priority Data
Jul. 4, 2006    (KR) .................... 10-2006-0062500

(51) Int. Cl.
*F16D 1/00*    (2006.01)
(52) U.S. Cl. .................... 403/353; 403/349; 439/332; 74/490.01
(58) Field of Classification Search .................... 901/8, 901/15, 16, 27, 50, 28, 6; 285/124.3, 920, 285/124.5, 152.1, 153.1, 189; 403/349, 353, 403/348; 74/490.05, 490.02, 490.01; 439/294, 439/286, 312, 316, 317, 332, 288, 334
See application file for complete search history.

(56) References Cited

U.S. PATENT DOCUMENTS

| | | | | |
|---|---|---|---|---|
| 3,212,651 A * | 10/1965 | Specht et al. | .................. | 414/7 |
| 3,229,656 A * | 1/1966 | Bodey | .................. | 114/268 |
| 4,370,091 A * | 1/1983 | Gagliardi | .................. | 414/735 |
| 4,537,547 A * | 8/1985 | Cole | .................. | 414/5 |
| 4,636,135 A * | 1/1987 | Bancon | .................. | 414/730 |
| 4,763,401 A * | 8/1988 | Marinoni et al. | .................. | 483/10 |
| 4,766,775 A * | 8/1988 | Hodge | .................. | 74/490.01 |
| 4,826,230 A * | 5/1989 | Truchet | .................. | 294/88 |
| 4,828,453 A * | 5/1989 | Martin et al. | .................. | 414/738 |
| 4,883,400 A * | 11/1989 | Kuban et al. | .................. | 414/2 |
| 4,917,619 A * | 4/1990 | Nishiwaki | .................. | 439/191 |
| 5,018,901 A * | 5/1991 | Ferree et al. | .................. | 403/349 |
| 5,044,063 A * | 9/1991 | Voellmer | .................. | 483/59 |
| 5,197,846 A * | 3/1993 | Uno et al. | .................. | 414/731 |
| 5,256,128 A * | 10/1993 | Neumann | .................. | 483/1 |

(Continued)

*Primary Examiner*—David E Bochna
(74) *Attorney, Agent, or Firm*—Nixon & Vanderhye PC

(57) ABSTRACT

A system applicable to a bridge transporter telescopic servomanipulator, is provided. The bridge transporter telescopic servomanipulator is used for performing operation and maintenance of process equipments in a working environment having a possibility of radiation exposure. The system can be coupled/decoupled by including a coupling device in a telescopic transfer device and a servomanipulator, and can manipulate an ascending/descending device of the servomanipulator in a remote area without direct access by a worker. The coupling/decoupling device includes a first coupling plate and a second coupling plate, the first coupling plate being provided on a lower portion of the telescopic transfer device, and the second coupling plate being provided on an upper portion of the servomanipulator. While coupling protrusions are inserted into coupling holes being formed on the first coupling plate, position and orientation between a master servomanipulator and a slave servomanipulator correspond to each other, and the servomanipulator can be coupled with the telescopic transfer device since the coupling protrusions are fixed by rotating a rotation plate being provided on the second coupling plate.

8 Claims, 11 Drawing Sheets

U.S. PATENT DOCUMENTS 5,586,387 A * 12/1996 Nakatani et al. ............... 29/703
5,782,571 A * 7/1998 Hufford et al. ................ 403/31
6,073,512 A * 6/2000 McCormick et al. .......... 74/528
7,559,265 B2 * 7/2009 Mizuno .................... 74/490.06

* cited by examiner

TELESCOPIC SERVOMANIPULATOR COUPLING/DECOUPLING APPARATUS

CROSS-REFERENCE TO RELATED APPLICATION

This application claims the benefit of Korean Patent Application No. 10-2006-0062500, filed on Jul. 4, 2006, in the Korean Intellectual Property Office, the disclosure of which is incorporated herein by reference.

BACKGROUND OF THE INVENTION

1. Field of the Invention

The present invention relates to a coupling/decoupling of a telescopic servomanipulator, and more particularly, a coupling/decoupling apparatus which enables to attach/detach a master or a slave servomanipulator to a telescopic extension device easily and accurately with less labor of a single worker.

2. Description of Related Art

A hot cell of a radiation shielded facility is required to be provided in order to perform experiments associated with nuclear power generation and a spent nuclear fuel process. Since a worker is not admitted inside the hot cell due to a probability of radiation exposure, a master-slave manipulator system is used for operating, maintaining, and repairing the process equipments. A master manipulator is located outside the hot cell, and a slave manipulator is located inside the hot cell, and thereby the worker is able to securely work in the hot cell. A remote control technique is used, that is the slave manipulator at a remote area is operated when the worker operates the master manipulator.

The remote control technique is useful for the following business fields, such as an extreme working environment where a person is incapable of accessing, an adverse working environment of waste disposal, and a dangerous working environment of land mine removal. However, the remote control technique has disadvantages, in that a working efficiency may be decreased due to the lack of reality, and a breakdown of a system may occur since an immediate reaction to an unexpected accident, such as collision, is difficult. Accordingly, a new technique which can make the remote control work more realistically is needed. Particularly, a mechanical method or an electrical method which transmits contacting force information using a force feedback to the master manipulator is needed, the interacting force, between the slave manipulator and the working environment.

Also, a wall-mounted mechanical master-slave manipulator system, which is generally applicable to the hot cell, is limitedly used in a working environment since the mechanical master-slave manipulator system is fixed to an inside wall of the hot cell. To solve the limitation of the working coverage, a plurality of identical apparatuses may be arranged in parallel to work. However, this method is not effective since the method may cause waste of resources.

To solve the limitation of the working coverage of the wall-mounted mechanical master-slave manipulator system, an electrical bridge transported servomanipulator, in which a manipulator is coupled with a bridge transporter, is used. For the bridge transporter, a telescopic extension device is generally coupled on a bottom of the transporter being capable of moving the telescopic extension device on a plane, such as a crane, and a manipulator is coupled on a bottom of the telescopic extension device. In a conventional bridge transporter, for repairing or diagnosis, there is a need to decouple the manipulator from the bridge transporter, and accordingly the following problems may occur.

First, when a worker manually lifts up the servomanipulator to couple/decouple the manipulator to/from the telescopic extension device, a plurality of workers are needed, therefore a working efficiency may be decreased and an accident may occur due to direct handling of heave equipment.

Secondly, when a breakdown of the bridge mounted servomanipulator occurs, a worker wearing a special protective clothes cannot access to the dangerous working environment immediately due to the possibility of the radiation exposure. Therefore, the worker waits until a level of radiation is decreased to an acceptable level, which leads the working efficiency be decreased. Accordingly, it may be desirable to couple/decouple the BTSM (Bridge Transported Servo Manipulator) via the remote control by using the wall-mounted mechanical manipulator. However, there is a problem, in that it is difficult to accurately couple the manipulator to the telescopic extension device in an identical location and direction.

Thus, a new apparatus capable of easily and accurately coupling/decoupling the manipulator with minimal labor of a worker is required.

BRIEF SUMMARY

An aspect of the present invention provides a coupling/decoupling device and a telescopic master-slave servomanipulator system including the coupling/decoupling device, the coupling/decoupling device being capable of easily and accurately coupling a slave servomanipulator even when irregularities exist.

Another aspect of the present invention also provides a coupling/decoupling device and a telescopic master-slave servomanipulator system including the coupling/decoupling device, the coupling/decoupling device being capable of accurately coupling a servomanipulator directionally and locationally via a simple remote control by using an ascending/descending device, which is omnidirectionally on a plane, instead of a plurality of workers manually lifting up to couple/decouple the servomanipulator or a telescopic extension device.

Another aspect of the present invention also provides a coupling/decoupling device and a telescopic master-slave servomanipulator system including the coupling/decoupling device, the coupling/decoupling device includes a connector and a connection portion which transmits/receives an electrical signal on a center of the coupling/decoupling device. The connector and connection portion are capable of being coupled/decoupled when the servomanipulator is coupled/decoupled, and thereby both mechanical and electrical portion of the servomanipulator are simultaneously coupled/decoupled, thereby being capable of preventing damage occurring due to a contact since a signal cable is not exposed to an outside.

According to an aspect of the present invention, there is provided a telescopic master-slave servomanipulator system including: a master servomanipulator being manipulated by a worker; a bridge transporter having x and y axes so as to move along a guide rail, and having a telescopic extension device so as to ascend/descend along a z axis; a slave servomanipulator being coupled on a bottom of the bridge transporter, receiving a signal of the master servomanipulator so as to duplicate movement of the master servomanipulator in a working environment; and a coupling device coupling/decoupling the slave servomanipulator with the bridge transporter, wherein, in the coupling device, cone-type coupling protrusions are coupled with coupling holes formed on a rotating plate, the rotating plate rotates so that the cone-type coupling protrusions are secured to the coupling holes.

The coupling/decoupling device may further include a fixing lever being bolt-coupled or being inserted by rotation so as to fix the rotating plate to the second coupling plate. Also, the telescopic master-slave servomanipulator system may further include a movable ascending/descending device being capable of having the slave servomanipulator located thereon, ascending/descending the slave servomanipulator, and omnidirectionally moving on a plane by including an omni-directional transfer wheel. The coupling/decoupling device may further include a connector transmitting/receiving an electrical signal, and a connection portion being capable of coupling/decoupling with the connector in a center of the coupling/decoupling device.

The coupling device further includes a protruding guide pin, and a body portion including the second coupling hole so that the protruding guide pin is inserted into the body portion, and a height of the protruding guide pin is lower than the cone-type coupling protrusions, and higher than the connector.

The slave servomanipulator may be coupled/decoupled on a bottom of the telescopic extension device. The bridge transporter has x and y axes units so as to move along a guide rail, and has a z axis transfer unit of a telescopic extension device so as to be downwardly expanded. A plurality of cameras are joined in a slave servomanipulator operating environment, and a video being taken by the plurality of cameras is transmitted to an environment where the master servomanipulator is located so that the worker is able to monitor the slave servomanipulator operating environment. The slave servomanipulator includes a sensing unit to transmit a contacting force occurring when contacting a substance to a force feedback control of the master servomanipulator, and exerts a force on the master servomanipulator in proportion to the contacting force.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
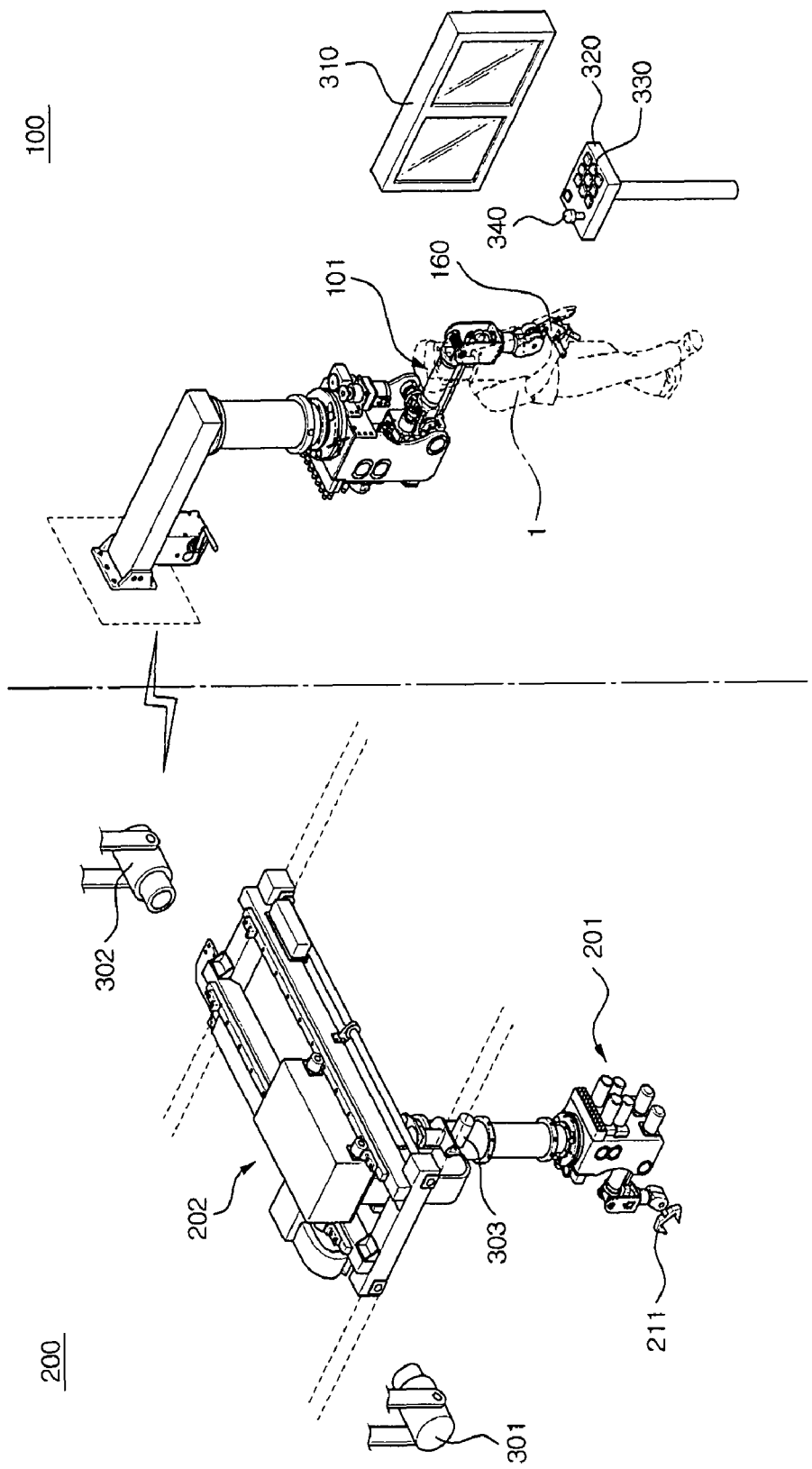
FIG. 1 is a perspective view illustrating a telescopic master-slave servomanipulator system according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Initially, an entire figure of a telescopic master-slave servomanipulator system will be described. FIG. 1 is a perspective view illustrating the telescopic master-slave servomanipulator system according to an exemplary embodiment of the present invention.

As illustrated in FIG. 1, a slave servomanipulator system 200 is joined in a process cell having a probability of radiation exposure by a spent nuclear fuel, and a master servomanipulator system 100 is joined outside the process cell, and a worker 1 manipulates the master servomanipulator system 100. A bridge transporter 202 is able to move from a ceiling of the process cell in x and y axes, and is able to ascend/descend in a z axis. A slave servomanipulator 201 is coupled on a bottom of the bridge transporter 202 so as to spatially move, and which will be described in FIG. 3.

When the worker 1 operates a master servomanipulator 101, an operation signal is converted to an electrical signal, the electrical signal is transmitted to the slave servomanipulator 201 and the bridge transporter 202, and thereby the slave servomanipulator system 200 moves. That is, the slave servomanipulator 201 duplicates the movement of the master servomanipulator 101. Since the master servomanipulator 101 exerts six-degree of freedom, a handle 160 is able to exert three-dimensional movement, and also is able to exert three-way rotation, this movement is transmitted to the slave servomanipulator 201, and thereby a gripper 211 is able to move in six degrees of freedom.

A plurality of cameras 301 and 302 take a video of an inside of the process cell, in which the slave servomanipulator system 200 is coupled, and provide a monitor 310 of the worker 1 with the video being taken. The worker 1 operates the master servomanipulator system 100 while viewing the monitor 310, and thereby manipulates movement of the slave servomanipulator system 200. The cameras 301 and 302 may be joined in the bridge transporter 202 or the slave servomanipulator system 200, and a number of cameras may be freely configured. The cameras 301 and 302 may be made of a material being robust against radiation, and may be sealed with a cover, the cover being made of a material being robust against radiation.

A control panel 320 is provided in front of the worker 1, and the control panel 320 includes a joy stick 340 capable of manipulating a shooting angle of the cameras 301 and 302, or operational buttons 330.

The operational buttons 330 are used to move each articulator of the slave servomanipulator 201 without relying on the master servomanipulator 101, more particularly, the movement of the slave servomanipulator 201 may be manipulated by operating the operational buttons 330 in a situation where a breakdown of the master servomanipulator 101 or other unexpected conditions occur.

Hereinafter, a master servomanipulator system will be described.

Figure 2:
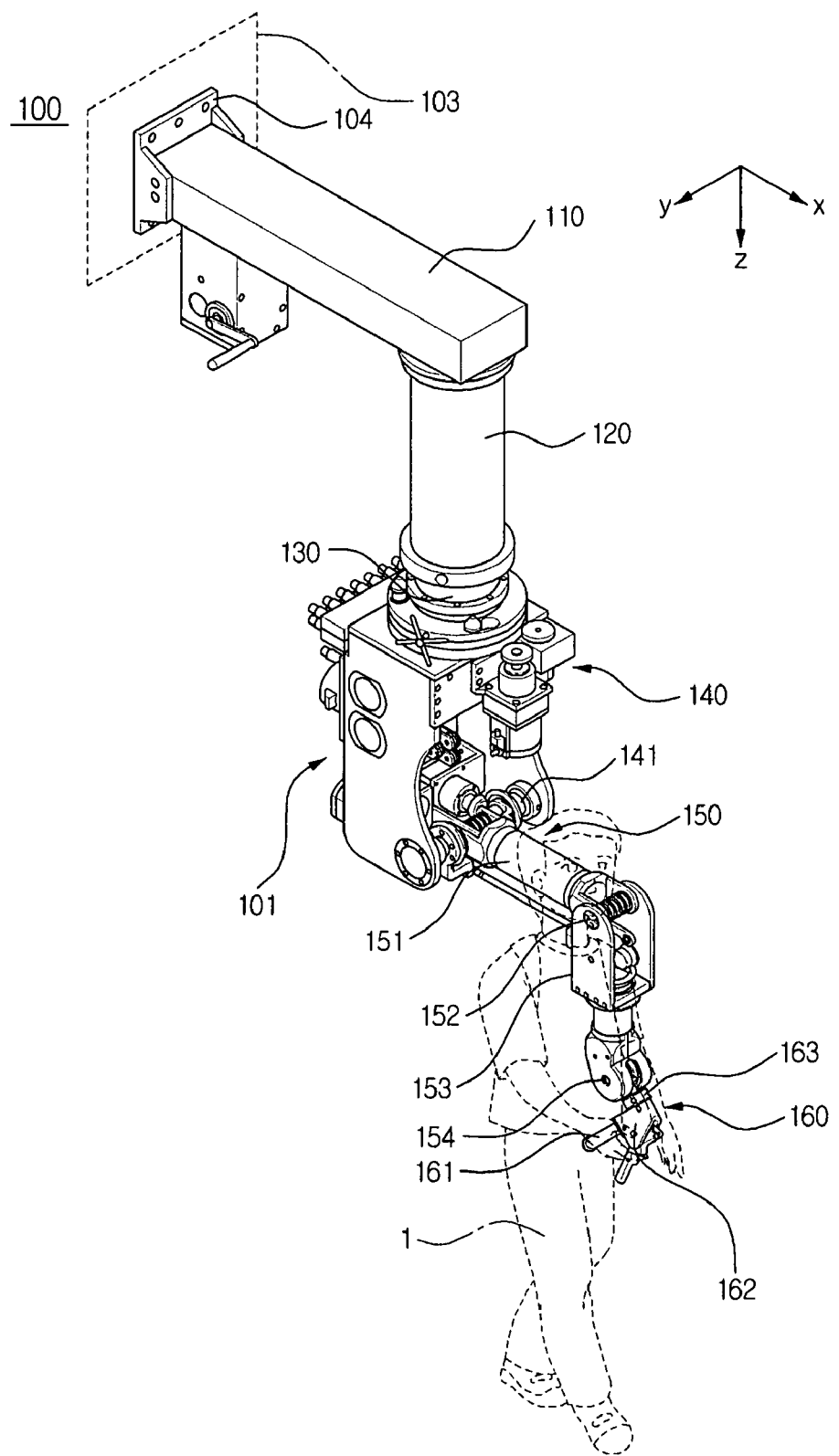
FIG. 2 is a perspective view illustrating a master servomanipulator system according to an exemplary embodiment of the present invention.
Figure 3:
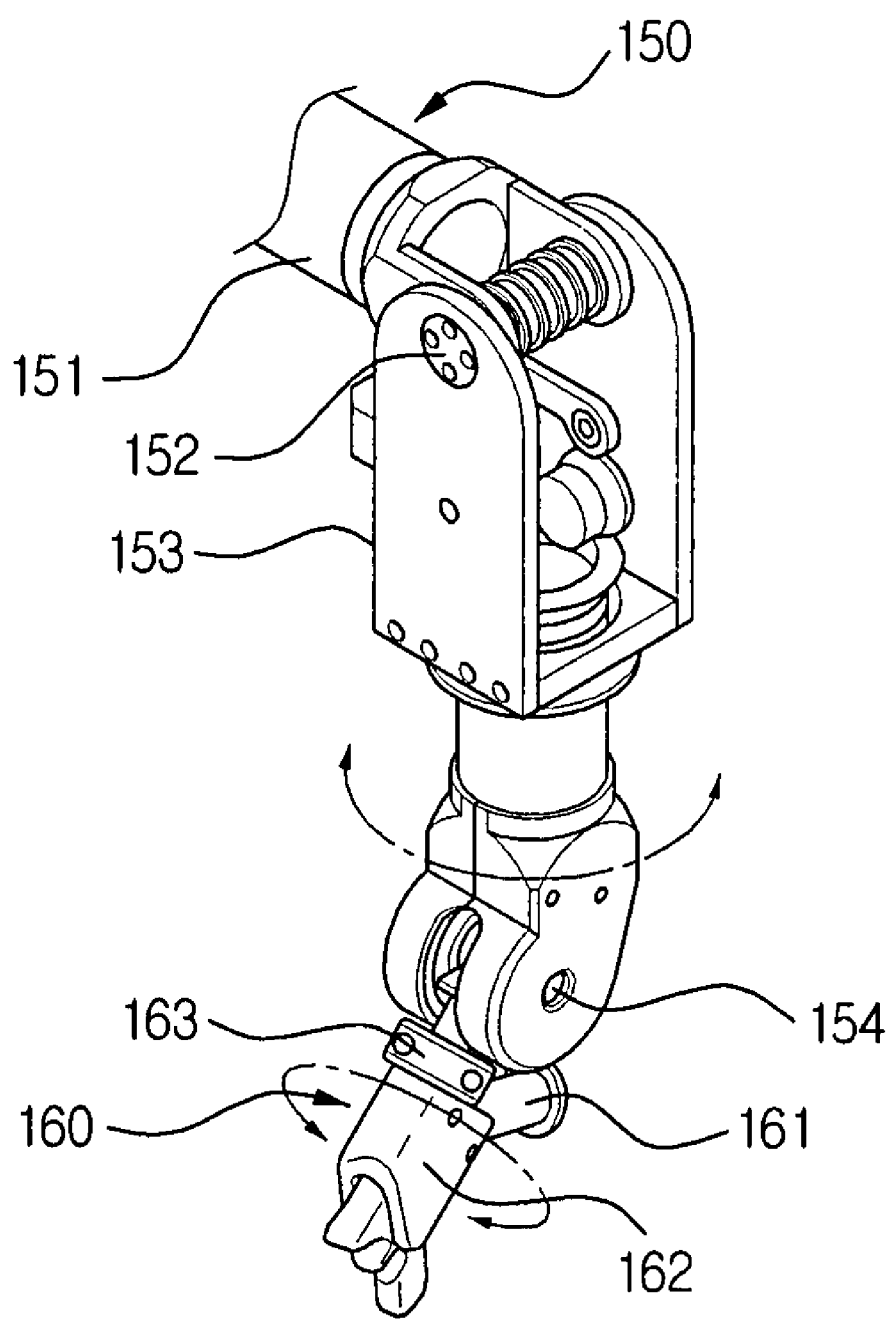
FIG. 3 is a perspective view illustrating a handle of a master servomanipulator system rotates according to an exemplary embodiment of the present invention.
Figure 4:
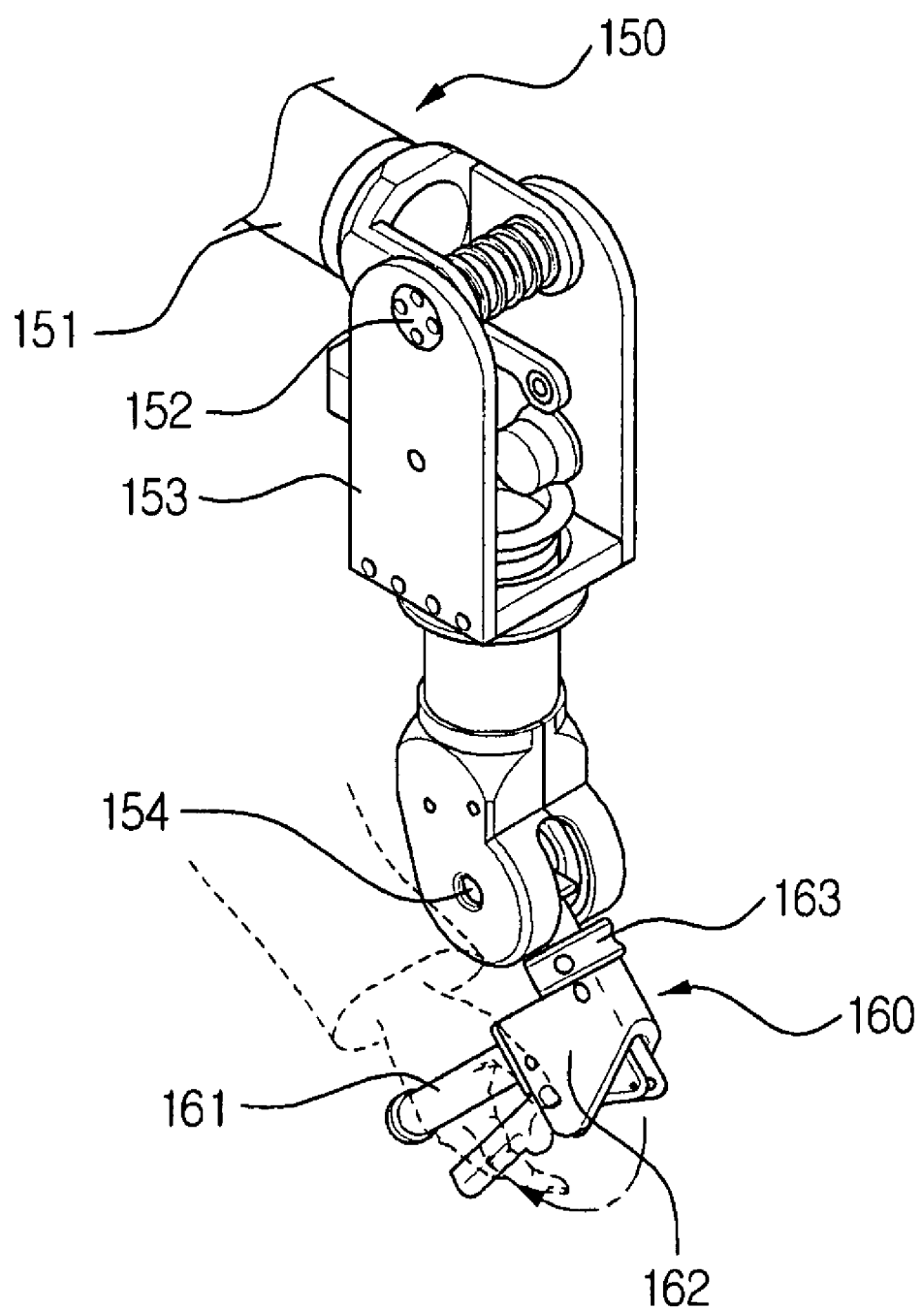
FIG. 4 is a perspective view illustrating operation of a grip of a handle of a master servomanipulator system according to an exemplary embodiment of the present invention.

FIG. 2 is a perspective view illustrating a master servomanipulator system according to an exemplary embodiment of the present invention, FIG. 3 is a perspective view illustrating a handle of a master servomanipulator system rotates according to an exemplary embodiment of the present invention, and FIG. 4 is a perspective view illustrating a grip of a handle of a master servomanipulator system operates according to an exemplary embodiment of the present invention.

A fixing plate 104 is formed on a wall 103 of the master servomanipulator system 100, and a horizontal body 110 is connected to the fixing plate 104, the horizontal body 110 being horizontally formed. A telescopic extension device 120 is formed on an end of the horizontal body 110, the telescopic extension device 120 being capable of moving in a z axis direction. A conversion unit 140, which converts motion of the master servomanipulator 101 to an electrical signal, is provided on the master servomanipulator 101 being provided on a lower end of the telescopic extension device 120. The motion of the master servomanipulator 101 is transmitted to the conversion unit 140 via a wire or a gear.

The worker 1 grips to operate a grip 161 of the handle 160, and the handle 160 is able to move in six degrees of freedom since the handle 160 is connected to the conversion unit 140 via the connection unit 150. Specifically, a first articulation 151 is rotatably provided on a first rotation axis 141, and a second articulation 153 is rotatably provided on a second rotation axis 152. A third rotation axis 154 is provided on the second articulation 153, and the handle 160 is rotatably provided on the third rotation axis 154.

The handle 160 includes the grip 161 and a mounting body 162 being provided with the grip 161, a rotation plate 163 is provided on the mounting body 162, and thereby the mounting body 162 is able to rotate. The rotation plate 163 rotates on a basis of the third rotation axis 154, and provides the grip 161 with rotation motion by including a bearing.

The grip 161 is able to exert three-dimensional rotation/translation by a rotational motion of the rotation plate 163 and rotational motion of the first and second articulation 151 and 153. Also, the grip 161 is configured to be gripped so that the slave servomanipulator system 200 exerts a gripper tongs operation.

Figure 5:
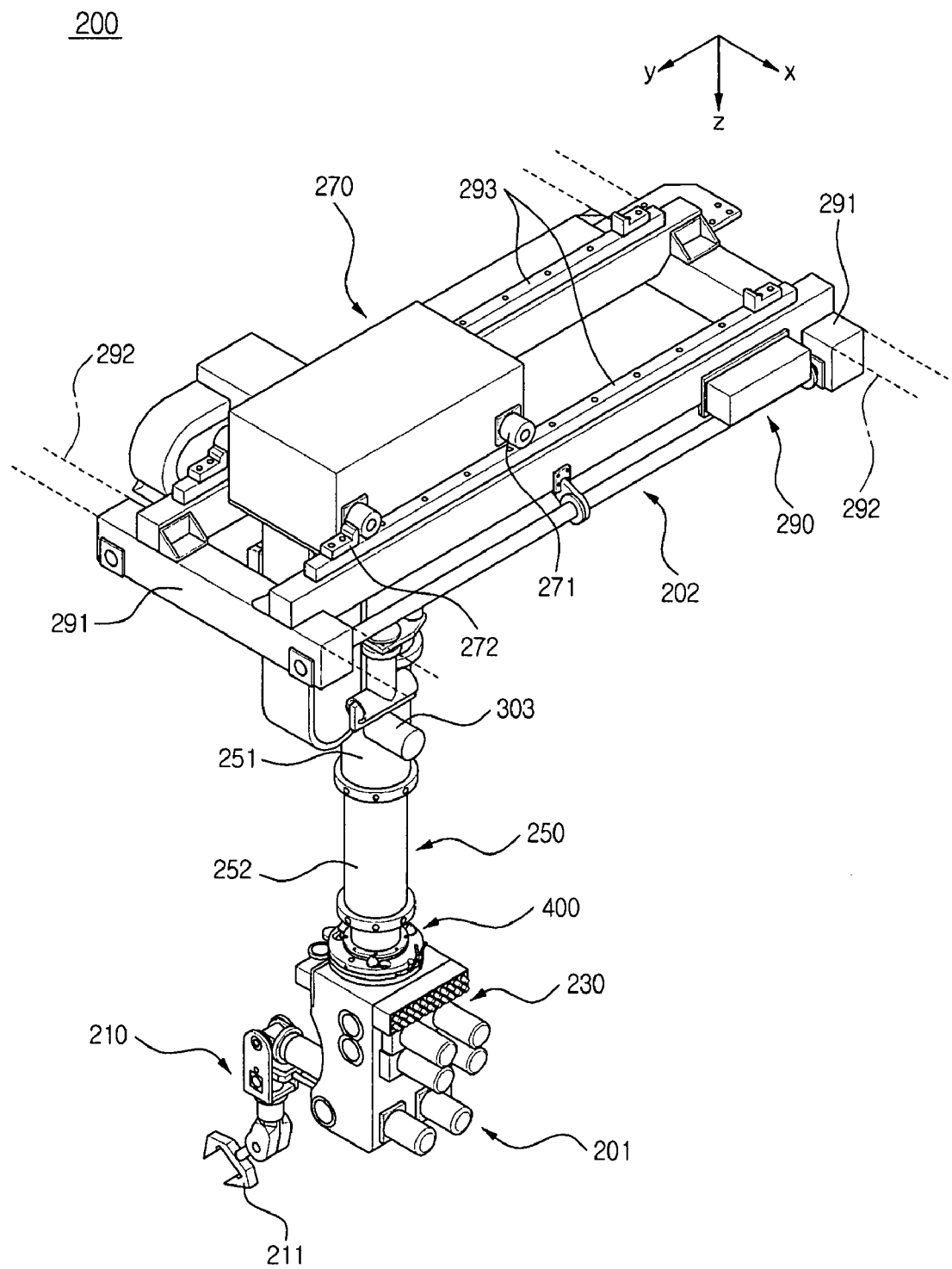
FIG. 5 is a perspective view illustrating a slave servomanipulator system according to an exemplary embodiment of the present invention.

FIG. 5 is a perspective view illustrating a slave servomanipulator 201 according to an exemplary embodiment of the present invention.

As illustrated in FIG. 5, the slave servomanipulator 201 is detachably coupled on a bottom of a bridge transporter 202. The bridge transporter moves the slave servomanipulator 201 along x and y axes, or ascends/descends the slave servomanipulator 201 along a z axis. Specifically, a pair of guide rails 292 are coupled on the ceiling of the process cell in the x axis direction, a pair of y axis guide rails 293 are provided between an x axis transfer unit 290, and a y axis transfer unit 270 moves along the pair of y axis guide rails 293.

The x axis transfer unit 290 may be plural. The x axis transfer unit 290 is in a rectangular-shaped box, includes a motor, a reducing gear, a clutch, and a gear therein, and generates a driving force to transmit the driving force to a steel wheel (not shown). When the steel wheel moves along the pair of guide rails 292, thereby x axis movement is possible.

The y axis transfer unit 270 is able to move along the pair of y axis guide rails 293 since four transfer wheels 271 are coupled with four ends of the y axis transfer unit 270. Stoppers 272 are provided to ends of the pair of y axis guide rails 293, and thereby the slave servomanipulator 201 is secured to the pair of y axis guide rails 293.

The telescopic extension device 250 is provided on a bottom of the y axis transfer unit 270, a coupling device 400 is provided on a bottom of the telescopic extension device 250, the coupling device 400 coupling/decoupling the telescopic extension device 250 and the slave servomanipulator 201.

The telescopic extension device 250 includes a fixed column 251 being configured in a cylinder-type column, and a moving column 252 being folded or unfolded, thereby having the slave servomanipulator 201 vertically move.

When the moving column 252 ascends, an end of the moving column 252 is inserted inside the fixed column 251 while overlapping with the fixed column 251, thereby lifts up the slave servomanipulator 201. When the moving column 252 descends, the end of the moving column 252 is exposed to an outside, and thereby brings the slave servomanipulator 201 down.

An actuator unit 230 regularly receives a signal by manipulation of a worker operating the slave servomanipulator 201. Specifically, when the worker manipulates a master servomanipulator 101, a motion signal with respect to the master servomanipulator 101 is changed to an electrical signal, the electrical signal is inputted to a manipulation unit (not shown), and the manipulation unit transmits the electrical signal to the actuator unit 230 of the slave servomanipulator 201. In this instance, a gripper unit 210 of the slave servomanipulator 201 identically operates to the master servomanipulator 101 by duplicating motions of the master servomanipulator 101.

The gripper unit 210 is connected via a wire or a gear to receive a driving force of the actuator unit 230, and is rotatably connected to the actuator unit 230. The gripper unit 210 includes a gripper 211. The gripper 211 is able to rotate to move, and is able to perform a gripping action, thereby grip an object for working to locate in a required location after rotating/moving.

The telescopic extension device 250 and the slave servomanipulator 201 are able to be coupled/decoupled by the coupling device 400, and will be described later.

Hereinafter, operation of a telescopic master-slave servomanipulator system will be described.

A slave servomanipulator system 200 is located in a dangerous working environment, such as a process cell, and a master servomanipulator system 100 is located in a safe area without a probability of radiation exposure. A video with respect to the working environment is provided to a worker via a camera 303 being joined on a wall, a transfer device, or the slave servomanipulator system 200.

The worker moves the slave servomanipulator 201 by manipulating the master servomanipulator 101 while viewing a monitor, each articulation of the slave servomanipulator 201 is transmitted to the wire or the gear, and the transmitted each articulation of the slave servomanipulator 201 is converted to an electrical signal by the conversion unit 140 including an encoder. The electrical signal is transmitted to the slave servomanipulator 201 via the control unit, and the actuator unit 230 of the slave servomanipulator 201, which includes a plurality of motors, has the gripper 211 exerting three-dimensional movement, or has the gripper 211 rotated. The gripper 211 contacts to a dangerous substance such as spent nuclear fuel, and performs a job required by the worker.

In this instance, when the worker manipulates the master servomanipulator 101 viewing a monitor only, a breakdown may occur since reality of a working environment is decreased, that is, the gripper 211 may collide with an object for working. To prevent the breakdown, a position or a torque sensor is provided to a sensing unit (not shown) of the slave servomanipulator 201, a signal of the position or the torque sensor is fed back to the master servomanipulator 101, and a force feedback is performed with respect to the worker.

Figure 6:
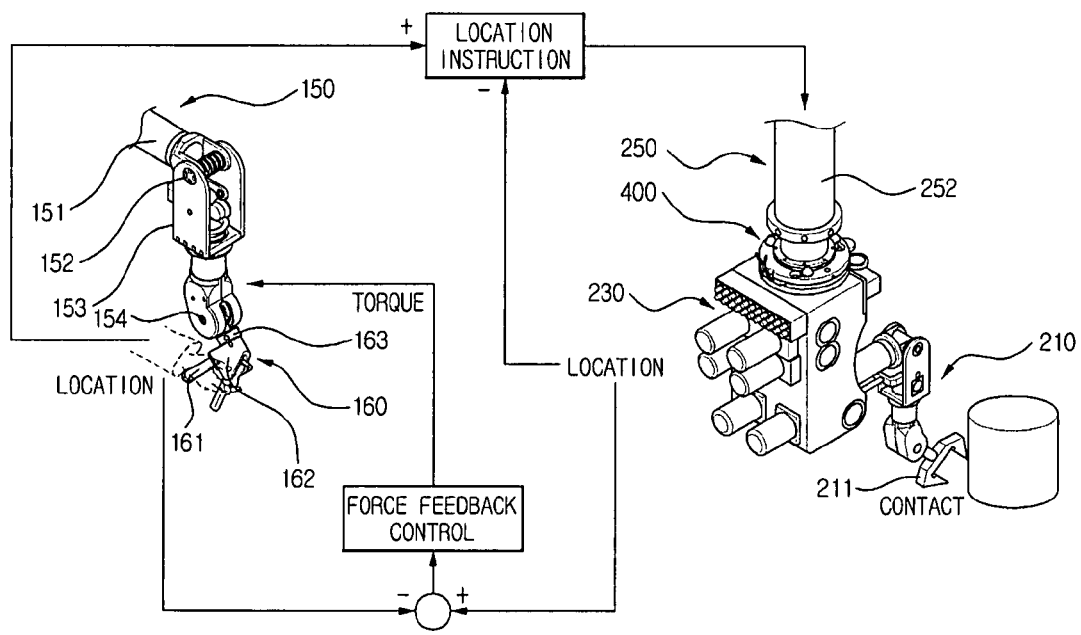
FIG. 6 is a configuration diagram illustrating a force feedback control according to an exemplary embodiment of the present invention.

A force feedback control system is illustrated in FIG. 6. FIG. 6 is a configuration diagram illustrating the force feedback control according to an exemplary embodiment of the present invention.

When the gripper 211 is contacted to an object, a sensing unit (not shown) recognizes the contacting of the gripper 211. The sensing unit generates an electrical signal, and transmits a current value or a voltage value to a master servomanipulator 101 via a manipulation unit (not shown), the current value or the voltage value being in proportion to a contacting force. A torque is generated in proportion to the electrical signal, and a worker begins to feel a resistance force since a motor and the like are joined to an actuator unit 230 of the master servomanipulator 101. The worker gripping a grip 161 begins to feel the fed back torque, may perceive a collision and the like, consequently reality is increased. That is, since the worker feels a force feedback with respect to a direction where an obstacle exists, a location signal is not transmitted with respect to the direction where the obstacle exists.

Accordingly, the slave servomanipulator 201 may be prevented from repeatedly colliding with the obstacles, and the worker may experience a better sense of reality due to using information of a tactile sense as well as video information being provided from a camera. In this instance, as illustrated in FIG. 6, an appropriate amount of a force feedback may be exerted by adjusting a controller gain for the manipulation unit.

Accordingly, by using a signal of the tactile sense via the force feedback and a signal of a visual sense via the camera, the worker may manipulate the master servomanipulator 101 by immediately reflecting reality, and may manipulate the slave servomanipulator 201 at a remote distance.

Figure 7:
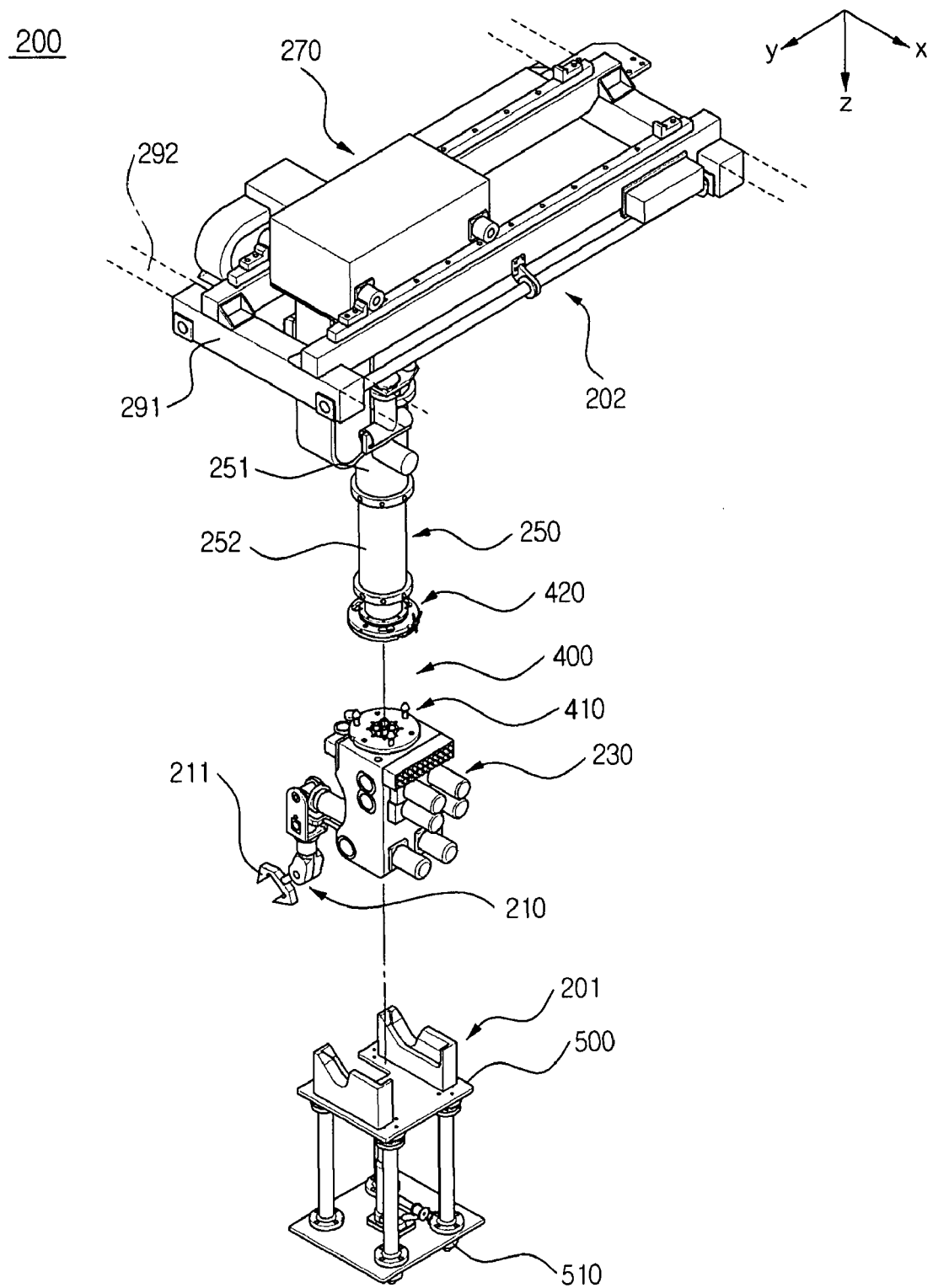
FIG. 7 is a perspective view illustrating a slave servomanipulator is separated according to an exemplary embodiment of the present invention.

In this instance, the slave servomanipulator 201 is detachably configured for repair, in the case of a breakdown, which will be illustrated from FIG. 7.

FIG. 7 is a perspective view illustrating a slave servomanipulator is separated according to an exemplary embodiment of the present invention.

A telescopic extension device 250 and a slave servomanipulator 201 are coupled/decoupled with each other by a coupling device 400. The coupling device 400 includes a first coupling plate 410 and a second coupling plate 420. The first coupling plate 410 is coupled with a top of the slave servomanipulator 201, and the second slave servomanipulator is coupled with a bottom of the telescopic extension device 250, and is able to be coupled/decoupled with the first coupling plate 410.

The slave servomanipulator 201 and the telescopic extension device 250 are coupled/decoupled with each other by coupling/decoupling of the first coupling plate 410 and the second coupling plate 420.

A decoupled slave servomanipulator 201 is located on a movable ascending/descending device 500, and thereby is able to be transferred in a working environment such as a process cell. Since risk factors such as radiation exposure exist in the working environment, the movable ascending/descending device 500 may operate by itself by including a driving unit, or may be transferred by another manipulator. The movable ascending/descending device 500 includes a driving wheel 510. The driving wheel 510 may be able to move in two-dimensional directions so as to help coupling, and may ascend/descend the transferred slave servomanipulator 201 to a predetermined height.

Figure 8:
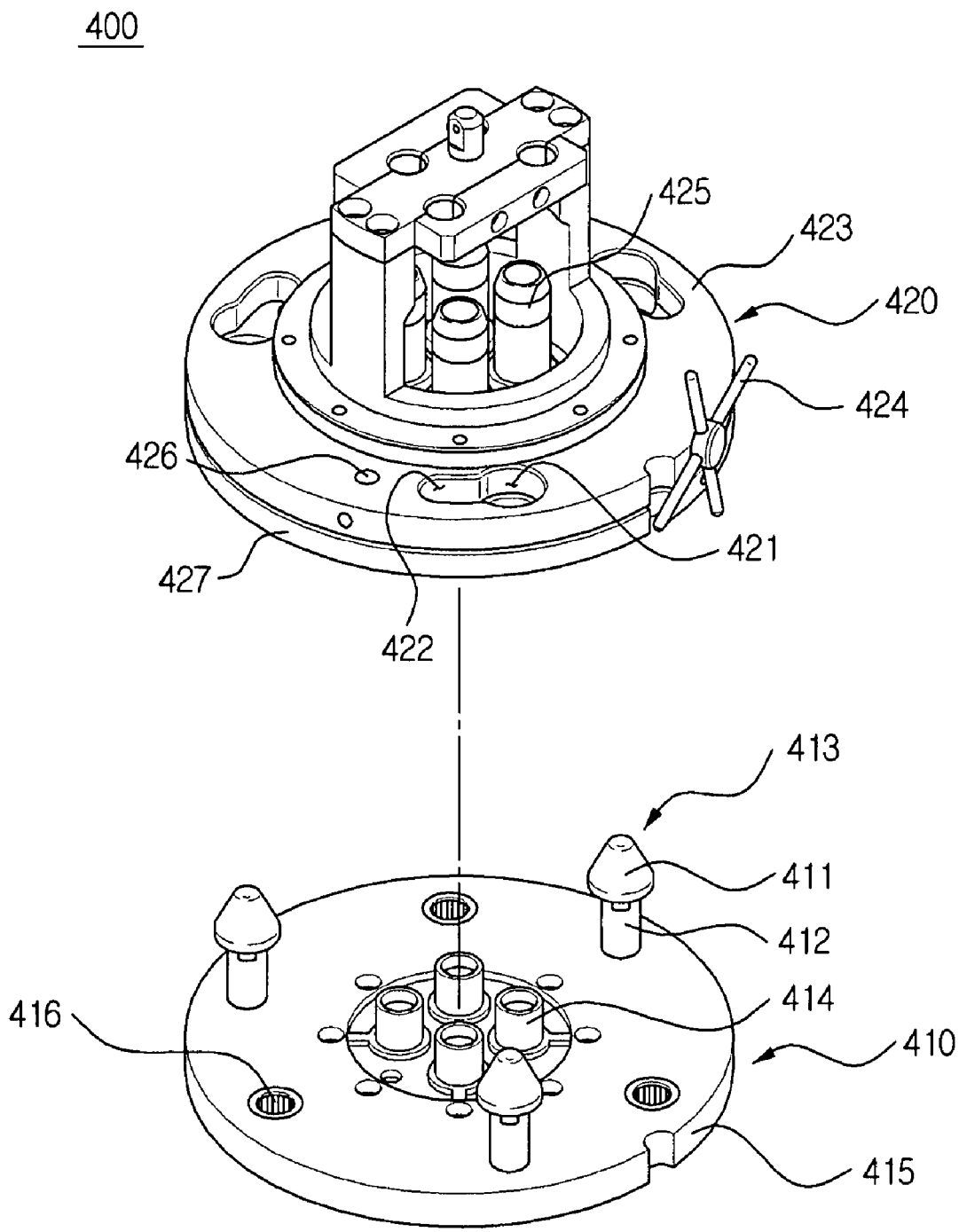
FIG. 8 is an exploded perspective view illustrating a coupling device according to an exemplary embodiment of the present invention.
Figure 9:
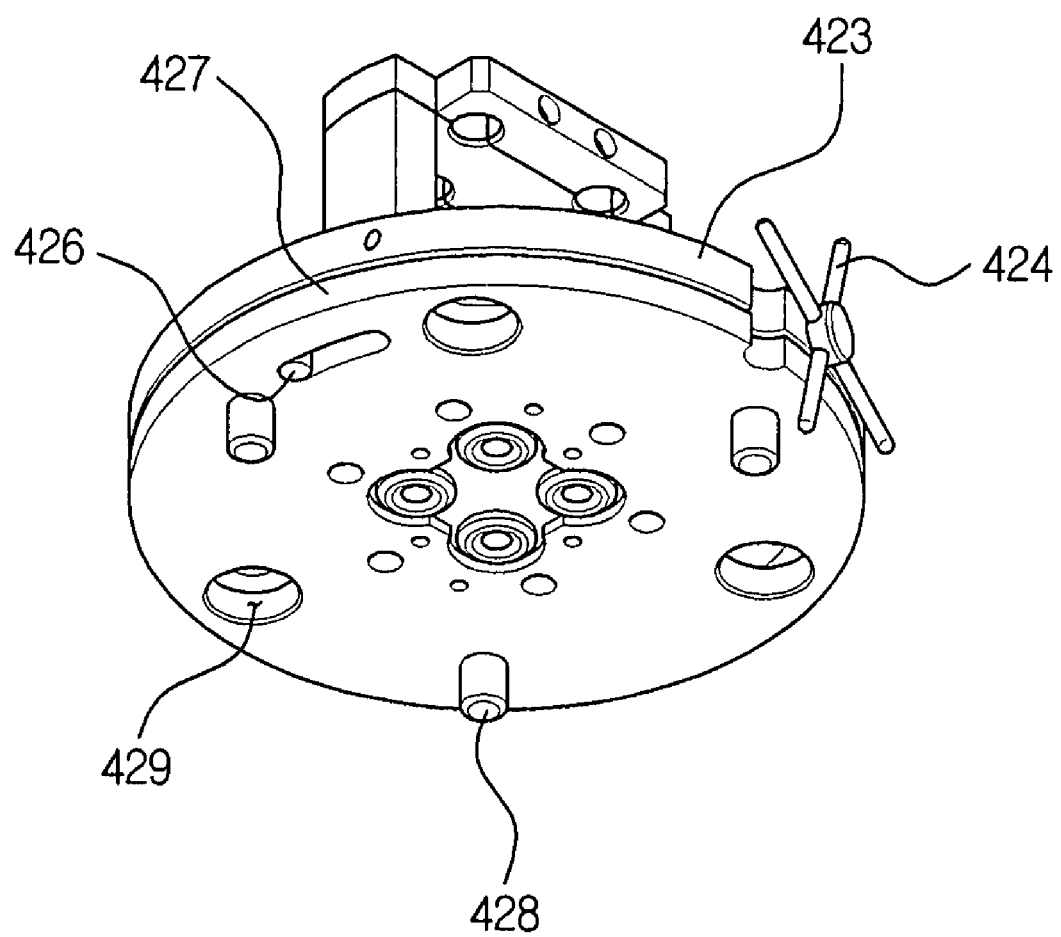
FIG. 9 is a perspective view illustrating a bottom of a second coupling plate according to an exemplary embodiment of the present invention.

Hereinafter, coupling of the coupling device will be described. FIG. 8 is an exploded perspective view illustrating a coupling device according to an exemplary embodiment of the present invention, and FIG. 9 is a perspective view illustrating a bottom of a second coupling plate according to an exemplary embodiment of the present invention.

As illustrated in FIG. 8, a coupling protrusion 413 is formed on a top of a first coupling plate 410. The coupling protrusion 413 includes a protruding portion 412 and an expansion portion 411. The protruding portion 412 is formed vertically formed, and the expansion portion 411 is connected to the protruding portion 412, and a diameter of the expansion portion 411 is expansively formed. The protruding portion 412 is formed in a cylindrical shape, and the expansion portion 411 is formed in a cone shape such as a mushroom.

The first coupling plate 410 includes a first coupling plate body 415, and three of the coupling protrusions 413 are formed on a top surface of the first coupling plate body 415 with an interval of 120 degrees. It is obvious that the shape of the first coupling plate 410 and the number and angle of the coupling protrusions 413 may be varied. Second coupling guide holes 416 are provided among the coupling protrusions 413 with an interval of 120 degrees. Needle bearings are vertically provided in the second coupling guide holes 416. Connectors 414 are formed on a center of the first coupling plate 410, and thereby an electrical signal may be received/transmitted.

The second coupling plate 420 include a disk-type rotation plate 423, and coupling holes 421 and 422 are provided on the disk-type rotation plate 423. The disk-type rotation plate 423 is coupled with a second coupling plate body 427 so as to rotate. The coupling hole 421 is located in correspondence to the coupling protrusions 413 when being coupled.

The coupling holes include a first coupling hole 421 being formed in a cylindrical shape and a second coupling hole 422. The second coupling hole 422 is connected to the first coupling hole 421, and a diameter of the second coupling hole 422 is less than a diameter of the first coupling hole 421. The diameter of the first coupling hole 421 is greater than a diameter the expansion portion 411 of the coupling protrusions 413, and the diameter of the second coupling hole 422 is less than the diameter the expansion portion 411 of the coupling protrusions 413. In this instance, the diameter of the second coupling hole 422 is greater than a diameter of the protruding portion 412. The coupling protrusions 413 are inserted into the first and second coupling hole 421 and 422, which will be described later.

As illustrated in FIG. 9, a protruding guide pin 428 is downwardly formed between first coupling guide holes 429, and is coupled with the second coupling guide hole 416 of FIG. 8. A height of the protruding guide pin 428 may be lower than the coupling protrusions 413 of the first coupling plate 410. A stopper pin 426 is formed in a cylindrical shape on the rotation plate 423, and is inserted into the second coupling plate body 427 to limit rotation.

A connection portion 425 is formed on a center of the second coupling plate 420, and the connection portion 425 is able to be coupled with the connectors 414. The connection portion 425 is formed in correspondence to a number and location of the connectors 414. Fixing levers 424 are joined on a side of the rotation plate 423 to fix the first and second coupling plates 410 and 420. The fixing levers 424 are joined via a bolt or an insertings by rotation to fix the rotation plate 423 to the second coupling plate body 427, and thereby helps coupling of the first and the second coupling plates 410 and 420.

Figure 10:
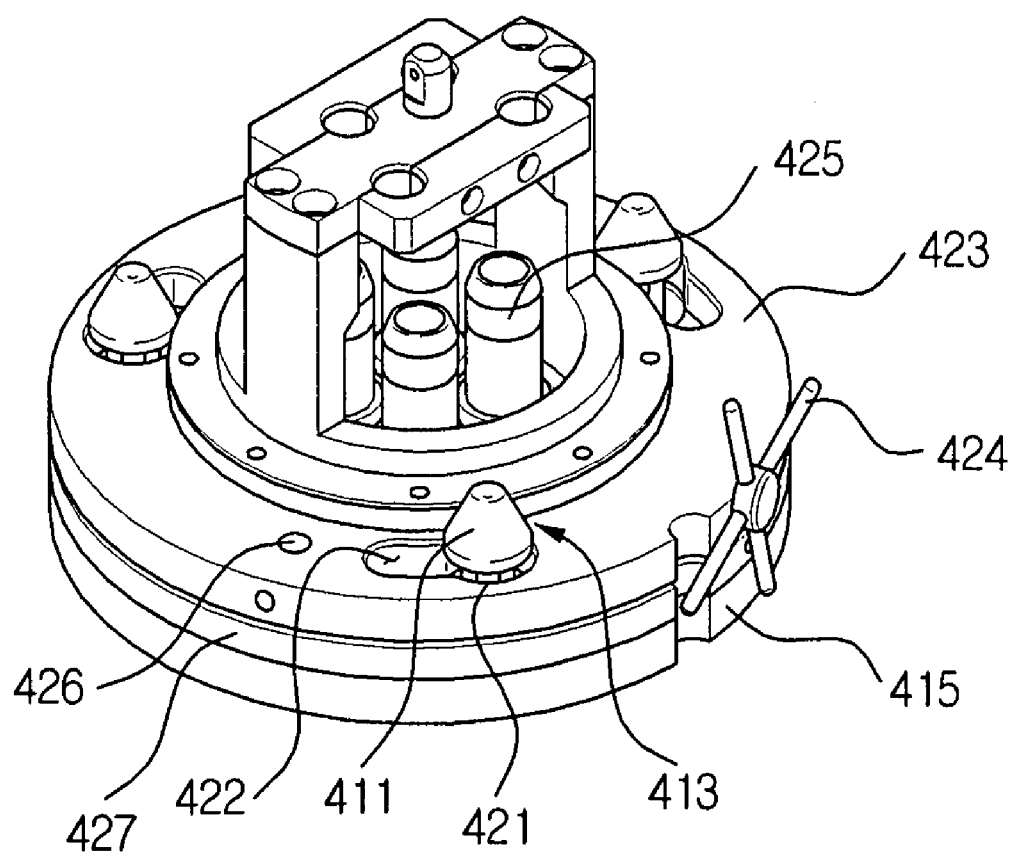
FIG. 10 is a perspective view illustrating a coupling protrusion is inserted before coupling according to an exemplary embodiment of the present invention.
Figure 11:
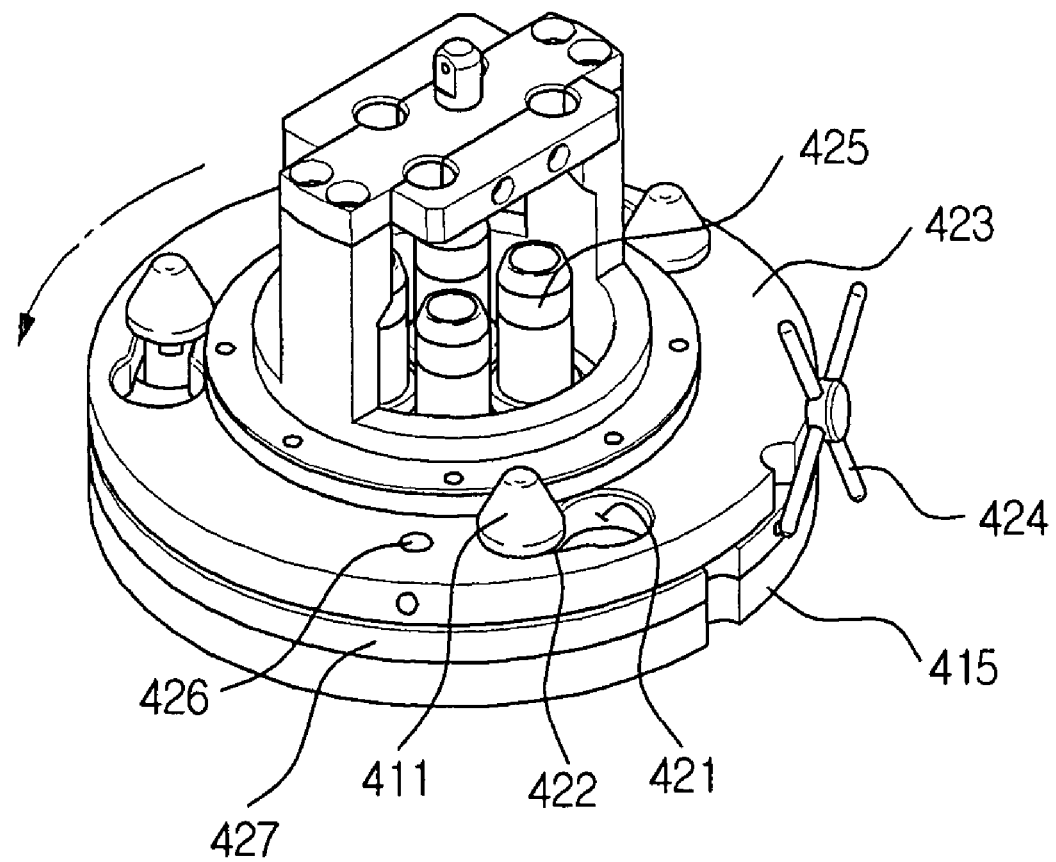
FIG. 11 is a perspective view illustrating a coupling protrusion is inserted after coupling according to an exemplary embodiment of the present invention.

An order of coupling will be described by referring to FIGS. 10 and 11. For coupling, the slave servomanipulator 201 is located on the movable ascending/descending device 500 of FIG. 7, and the slave servomanipulator 201 is transferred, and the slave servomanipulator 201 is ascended up to a required height using the movable ascending/descending device 500. Since the driving wheel 510 of the movable ascending/descending device 500 is able to move omnidirectionally the movable ascending/descending device 500 horizontally moves to correspond centers of the expansion portion 411 and the coupling holes 421 when the expansion portion 411 is required to be coupled with the coupling holes 421.

Since a length of the protruding guide pin 428 is shorter than the coupling protrusions 413 of the first coupling plate 410, after the expansion portion 411 of the coupling protrusions 413 is inserted into the first coupling guide hole 429, and the expansion portion 411 is inserted into the first coupling guide hole 421. The above description is described in detail with reference to FIG. 10. Since the expansion portion 411 is formed in a cone shape, the expansion portion 411 is coupled with the first coupling guide hole 429 via contact correction. That is, once a top surface of the expansion portion 411 is located inside the first coupling guide hole 429, the expansion portion 411 slides to be inserted into the first coupling guide hole 429. When the expansion portion 411 is inserted into the first coupling guide hole 429, the protruding guide pin 428 is subsequently inserted into the second coupling guide hole 416 for fine positioning.

After the expansion portion 411 is inserted into the first coupling hole 421, the rotation plate 423 is rotated so that the second coupling hole 422 is located on a bottom of the expansion portion 411. Since a diameter of the second coupling hole 422 is less than a diameter of the expansion portion 411, the first coupling plate 420 is hanged on the second coupling plate 420. In this instance, the connector 414 is connected to the connection portion 425 to receive/transmit an electrical signal.

The fixing lever 424 is rotated to fix the rotation plate 423 to the second coupling plates body 427, and thereby assists in coupling of the first and second coupling plates 410 and 420.

Since operations of decoupling of the coupling device 400 into the first and second coupling plates 410 and 420 may be performed by reversely performing the coupling operations, descriptions regarding the operations of the decoupling will be omitted in the specification of the present invention.

As described from the above, a worker may immediately decouple a slave servomanipulator, and may transfer the slave servomanipulator to be repaired in a maintenance and repairing area when the slave servomanipulator breaks down, instead of the worker being required to wait until a level of radiation is decreased to an acceptable level. Also, it is possible to easily couple/decouple a slave servomanipulator using another manipulator with a simple manipulation since a worker is not required to be admitted to a working environment.

Also, a slave servomanipulator may be easily and accurately coupled even when irregularities exist. A master servomanipulator may adopt a coupling/decoupling device of the present invention.

According to the above-described exemplary embodiments of the present invention, there is provided a coupling/decoupling device capable of easily and accurately coupling a slave servomanipulator via contact correction even when irregularities exist.

Also, according to the above-described exemplary embodiments of the present invention, it is possible to accurately couple a servomanipulator via a simple remote control by coupling the servomanipulator on an ascending/descending device being capable of omnidirectionally moving on a plane, instead of a plurality of workers manually lifting up to couple/decouple the servomanipulator or a telescopic extension device.

Also, according to the above-described exemplary embodiments of the present invention, it is possible to simultaneously couple/decouple an instrument portion and a signal transmission portion, to prevent damage occurring due to a contact since a signal cable is not exposed to an outside for a connector and connection portion, having power and signal wires connected or disconnected, are provided in a center of a coupling device.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A servomanipulator coupling/decoupling apparatus which has a master servomanipulator being manipulated by a worker and a slave servomanipulator being operated in a radioactive working environment and duplicating movement of the master servomanipulator, comprising:
    a telescopic extension device ascending/descending the slave servomanipulator along a z axis;
    a first coupling plate being formed on a top of the slave servomanipulator, and including a cone-type coupling protrusion; and
    a second coupling plate being coupled on a bottom of the telescopic extension device and including a second coupling plate body with a coupling guide hole, and a rotating plate with a coupling hole being coupled with the second coupling plate body so as to be comparatively rotated with the second coupling plate body,
    wherein, after the cone-type coupling protrusion is inserted into the coupling hole, the rotating plate can be rotated so that the cone-type coupling protrusion is secured to the coupling hole,
    wherein the coupling hole comprises a first coupling hole being formed in a circular arc shape, and a second coupling hole being connected to the first coupling hole, and a diameter of the second coupling hole is less than a diameter of the first coupling hole,
    wherein the diameter of the first coupling hole is greater than a maximum diameter of the cone-type coupling protrusion, and the diameter of the second coupling hole is less than the maximum diameter of the cone-type coupling protrusion.

2. The apparatus of claim 1, wherein the cone-type coupling protrusion comprises:
    a protruding portion being vertically formed; and an expansion portion being connected to the protruding portion, a diameter of the expansion portion being expansively formed to be a cone shape.

3. The apparatus of claim 1, wherein there are three of the cone-type coupling protrusions, the coupling guide holes, and the coupling holes that are respectively formed with an interval of 120 degrees.

4. The apparatus of claim 1, further comprising:

a movable ascending/descending device being capable of having the slave servomanipulator located thereon, and ascending/descending the slave servomanipulator.

5. The apparatus of claim 1, further comprising:

a protruding guide pin on the second coupling plate; and the first coupling plate having a coupling hole that is formed so that the protruding guide pin can be inserted into the coupling hole.

6. The apparatus of claim 5, wherein the length of the protruding guide pin is less than the cone-type coupling protrusion, the first coupling plate has an upstanding connector, and the length of the protruding guide pin is greater than the length of the connector.

7. The apparatus of claim 1, further comprising:

a fixing lever on the rotating plate for securing it to the second coupling plate.

8. The apparatus of claim 1, further comprising a connector on the first coupling plate transmitting/receiving an electrical signal, and a connection portion on the second coupling plate being capable of coupling/decoupling with the connector.

* * * * *